United States Patent
Filser et al.

(10) Patent No.: US 10,417,155 B2
(45) Date of Patent: Sep. 17, 2019

(54) SUPER HUB SYSTEM AND THE METHOD THEREOF

(71) Applicant: Moduware PTY LTD, Melbourne (AU)

(72) Inventors: Frank Thomas Filser, Hong Kong (CN); Hubertus Friedrich Wasmer, Oberengstringen (CH); Lech Alexander Murawski, Shenzhen (CN)

(73) Assignee: MODUWARE PTY LTD, Melbourne (AU)

(*) Notice: Subject to any disclaimer, the term of this patent is extended or adjusted under 35 U.S.C. 154(b) by 127 days.

(21) Appl. No.: 15/315,729

(22) PCT Filed: Jun. 3, 2015

(86) PCT No.: PCT/CN2015/080722
§ 371 (c)(1),
(2) Date: Dec. 2, 2016

(87) PCT Pub. No.: WO2015/184994
PCT Pub. Date: Dec. 10, 2015

(65) Prior Publication Data
US 2017/0154001 A1 Jun. 1, 2017

Related U.S. Application Data

(60) Provisional application No. 62/141,869, filed on Apr. 2, 2015, provisional application No. 62/007,407, filed on Jun. 4, 2014.

(51) Int. Cl.
*G06F 13/40* (2006.01)
*G06F 13/42* (2006.01)
(Continued)

(52) U.S. Cl.
CPC ........ *G06F 13/4022* (2013.01); *G06F 1/3287* (2013.01); *G06F 13/364* (2013.01); *G06F 13/4282* (2013.01)

(58) Field of Classification Search
None
See application file for complete search history.

(56) References Cited

U.S. PATENT DOCUMENTS 6,717,801 B1 4/2004 Castell et al.
6,920,338 B2 7/2005 Engstrom et al.
(Continued)

FOREIGN PATENT DOCUMENTS

CN 1263292 A 8/2000
CN 201893486 U 7/2011
(Continued)

OTHER PUBLICATIONS

Devicefidelity, Inc. "In2Pay iCaisse4X NFC", Nov. 3, 2012.
(Continued)

*Primary Examiner* — Michael Sun
(74) *Attorney, Agent, or Firm* — Eagle IP Limited; Jacqueline C. Lui

(57) ABSTRACT

A system includes at least two ports (22, 24, 26) connected to particular electronic products. The system is able to intelligently detect the master/slave status of the electronic device and establish connecting routes among the ports (22, 24, 26) and the system accordingly. Each of the connecting route transfers at least electric power and optionally data. The system alleviates users' concern whether the electronic product to be connected to the system acts as a master or a slave. As such, electronic products can be connected to any port (22, 24, 26) available in the system.

28 Claims, 11 Drawing Sheets

(51) Int. Cl.
*G06F 1/3287* (2019.01)
*G06F 13/364* (2006.01)

(56) References Cited

U.S. PATENT DOCUMENTS

| | | | |
|---|---|---|---|
| 7,941,197 B2 | 5/2011 | Jain et al. | |
| 8,447,890 B1* | 5/2013 | LeTourneur | G06F 13/4022 |
| | | | 710/305 |
| 2004/0019732 A1* | 1/2004 | Overtoom | G06F 13/4022 |
| | | | 710/313 |
| 2004/0068535 A1* | 4/2004 | Subbiah | H04L 29/06 |
| | | | 709/200 |
| 2004/0202858 A1 | 10/2004 | Lee | |
| 2005/0286212 A1 | 12/2005 | Brignone | |
| 2007/0118674 A1* | 5/2007 | Ulenas | G06F 13/387 |
| | | | 710/305 |
| 2008/0060031 A1 | 3/2008 | Sekigawa | |
| 2008/0123287 A1 | 5/2008 | Rossell et al. | |
| 2010/0022277 A1 | 1/2010 | An | |
| 2010/0077126 A1 | 3/2010 | Huang et al. | |
| 2010/0078343 A1 | 4/2010 | Hoellwarth | |
| 2010/0220435 A1 | 9/2010 | Fahey | |
| 2011/0225328 A1* | 9/2011 | Ulenas | G06F 13/387 |
| | | | 710/58 |
| 2012/0281356 A1 | 11/2012 | Brewer | |
| 2012/0282977 A1 | 11/2012 | Haleluk | |
| 2015/0133204 A1 | 5/2015 | Ivanovski | |
| 2016/0283429 A1* | 9/2016 | Wagh | G06F 13/4022 |

FOREIGN PATENT DOCUMENTS

| | | |
|---|---|---|
| CN | 202444525 U | 9/2012 |
| CN | 203086527 U | 7/2013 |
| CN | 203193367 U | 9/2013 |
| EP | 1381205 A1 | 1/2004 |
| KR | 20080013536 A | 2/2008 |

OTHER PUBLICATIONS

Adevicefidelity, Inc., "In2Pay iCaisse", Nov. 3, 2012.
Charlie Corry, "iExpander—an expansion device for your iPhone", Sep. 11, 2012.
Tomas Ratas, "Mophie Juice Pack—iPhone 3G", Dec. 9, 2008.

* cited by examiner

| Power Output Priority \ Power Input Priority | Charge the internal battery of the portable device till 10% | charge the internal battery of the super hub system until 100mAh | Any electronic product that is connected to the super hub system | Charge the internal battery of the portable device till 100% | charge the internal battery of the super hub system until 100% | Charge the battery module connected to the modules docking hub till 100% |
|---|---|---|---|---|---|---|
| 1 Power supply | 1 | 2 | 3 | 4 | 5 | 6 |
| 2 Master electronic device | 1 | 2 | 3 | 4 | 5 | 6 |
| 3 Modules docking hub with battery module therein | 1 | 2 | 3 | 4 | --- | --- |
| 4 The internal battery of the super hub system | 1 | -- | 2 | 3 | -- | -- |
| 5 The internal battery of the portable device | -- | 1 | 2 | -- | -- | -- |

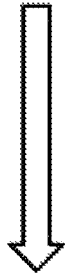

1st

SUPER HUB SYSTEM AND THE METHOD THEREOF

CROSS-REFERENCE TO RELATED APPLICATION

This application claims benefit under 35 U.S.C. § 119(e) of U.S. Provisional Application having Ser. No. 62/007,407 filed on Jun. 4, 2014, which is hereby incorporated by reference herein in its entirety. This application also claims priority from the U.S. Provisional Application having Ser. No. 62/141,869 filed on Apr. 2, 2015, which is hereby incorporated by reference herein in its entirety.

FIELD OF THE INVENTION

The present invention relates to the field of at least power routing and optionally data communications and in particular to a system and method for at least power routing and optionally data communications.

BACKGROUND ART

In recent years, there have been an increasing number of electronic products with ports for connecting each other. The electronic products include but not limited to computer accessories (e.g. keyboards, pointing devices, printers, disk drives, flash drive and network adapters), portable devices (e.g. smartphones, Personal Digital Assistance (PDA)), portable media players, digital cameras, various sensing devices such as blood-pressure or heart-beat monitors, pure power supply units (e.g. portable chargers), personal computers. One way to allow routing power and exchanging data among the electronic products is to connect the electronic products to a hub. However, in order to successfully route power and exchange data among the electronic products through the hub, the electronic product acting as a master has to be plugged into a specific port of the hub.

SUMMARY OF THE INVENTION

In the light of the foregoing background, it is an object of the present invention to provide an alternative solution. It is an object of the present invention to facilitate at least power routing and optionally data communications among electronic products, in particular, by intelligently assigning a port connected to a particular electronic product as master or slave.

Accordingly, the present invention, in one aspect, is a hub system (e.g. multiport device) configured to provide at least power routing and optionally data communications between different electronic products, including at least two ports configured to connect between the different electronic products; a hub including an upstream handler and at least one downstream handler, wherein the upstream handler is configured to connect at least one downstream handler inside the hub; a switch system capable of establishing connecting routes between each port to the upstream handler or to each of at least one downstream handler of the hub; and a controller configured to control the switch, wherein each connecting route transfers at least (electric) power and optionally data between the ports and the hub; wherein the controller is configured to control the switch to configure one of the ports as master by routing it to the upstream handler, and configure each remaining port as slave by routing each remaining port to one of the at least one downstream handler.

In one embodiment, the switch includes a matrix switch having a first predetermined number of inputs and a second predetermined number of outputs.

In yet another embodiment, at least one detector connected to at least one of the ports through a multiplexer connected to that port, wherein the detector configured to detect the electronic products connected to that port.

The present invention in yet another aspect is a method of operating a multiport device configured to provide at least power routing and optionally data communications between different electronic products including a step of determining a master-slave configuration of the multiport device including the steps of: a) receiving input signals from at least two ports of the multiport device, wherein the ports are connected to the different electronic products; b) analyzing each of the input signals based on a plurality of predetermined criteria; c) selecting one of the at least two ports to connect to an upstream handler of the multiport device based on at least one of the criteria and labeling the selected port as master; d) connecting each remaining port to one of the at least one downstream handler of the multiport device and labeling each remaining port as slave, wherein the upstream handler is configured to transfer at least (electric) power and optionally data to the at least one downstream handler; and the master controls the flow of at least (electric) power and optionally data between the master and each slave.

In one embodiment, the method further includes the steps of re-connecting the selected master port to one of the at least one downstream handler of the device and labeling it as slave; and re-connecting the one of each remaining port labeled as slave to the upstream handler of the device and labeling it as master, while the different electronic products are still connected to the ports.

The present invention in yet another aspect is a hub system (e.g. multiport device) configured to provide at least power routing and optionally data communications between different electronic products, including at least two ports configured to connect between the different electronic products; at least two gateways connected to the ports, respectively; and a control system connected to the gateways, wherein each gateway individually detects a master/slave status of the electronic product connected to the port; wherein the control system is configured to control each gateway to perform self-configuration to match the master/slave status of each electronic product connected to the port; wherein the control system is configured to establish connecting routes between each port for transferring at least electric power and optionally data between each port.

The present invention in yet another aspect is a method of operating a multiport device configured to provide at least power routing and optionally data communications between different electronic products including the steps of: a) receiving input signals from at least two ports of the multiport device, wherein the ports are connected to the different electronic products; b) detecting a master/slave status of each electronic product by analyzing each of the input signals of the port connected to the electronic product based on a plurality of predetermined criteria; c) configuring the multiport device to match the master/slave status of each electronic product connected to the multiport device, wherein at least power and optionally data can be exchanged among the electronic products and the multiport device.

There are many advantages to the present invention. First of all, the present invention facilitates power routing and optionally data communications between the electronic products by eliminating the hassle of the need for deciding which electronic product should be acted or acting or assigned as master, which would require it to be plugged into a specific master port and which electronic product(s) should be acted or acting or assigned as slave(s), which would require it/them to be plugged into a slave port(s).

The advantage of the present invention as stated above can be realized by allowing the electronic products to be plugged into any ports of the system of the present invention without worrying which electronic product should be acted or acting or assigned as master and which electronic product(s) should be acted or acting or assigned as slave(s). The system of the present invention will intelligently assign a port connected to a particular electronic product as master or slave. Another advantage of the present invention is that the electronic products connected to the system of the present invention can be switched between master and slave at the same port without the hassle of re-cabling as in conventional hub (e.g. un-plugging the electronic product from a slave port and re-plugging the electronic product to a master port). As such productivity can be enhanced. This advantage can be realized by "hot swap". "Hot swap" lets the system of the present invention intelligently, automatically and internally swapping the ports between master and slave for at least one time while the electronic products connected to them are staying in the same ports during power routing and optionally data communications. "Hot swap" further allows the system of the present invention intelligently, automatically and internally swapping the ports between master and slave when a particular electronic product connected to one of the ports of the system is replaced by another particular electronic product during power routing and optionally data communications.

BRIEF DESCRIPTION OF THE DRAWINGS

For a more complete understanding of the present invention, reference is made to the following detailed description and accompanying drawings, in which:

FIG. 7 shows a power output priority and power input priority table in accordance with one embodiment of the first version super hub system of the present invention;

DETAILED DESCRIPTION OF EMBODIMENTS

As used herein and in the claims, "comprising" means including the following elements but not excluding others.

Well-known circuits and devices are shown in block diagram form to avoid obscuring the present disclosure. The terms "couple" or "connect" as used herein means connected directly to or connected through one or more intervening components or circuits. The term "power-master" as used herein means a host/master that provides power to other devices. As far as power transfer goes, these other devices are referred to as "power-slave" devices. The term "data-master" as used herein means a host/master that acts as master device commanding and supervising all data transfers for the entire bus. Other devices connecting to the same bus would be data-slave devices, listening to the commands from the data-master before exchange data. Any of the signals provided over various buses described herein may be time-multiplexed with other signals and provided over one or more common buses. The term "bus" includes both wired and wireless communication technologies, and does not depend on the number of devices connected to a communication medium. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather includes within its scope all embodiments defined by the appended claims.

Figure 1:
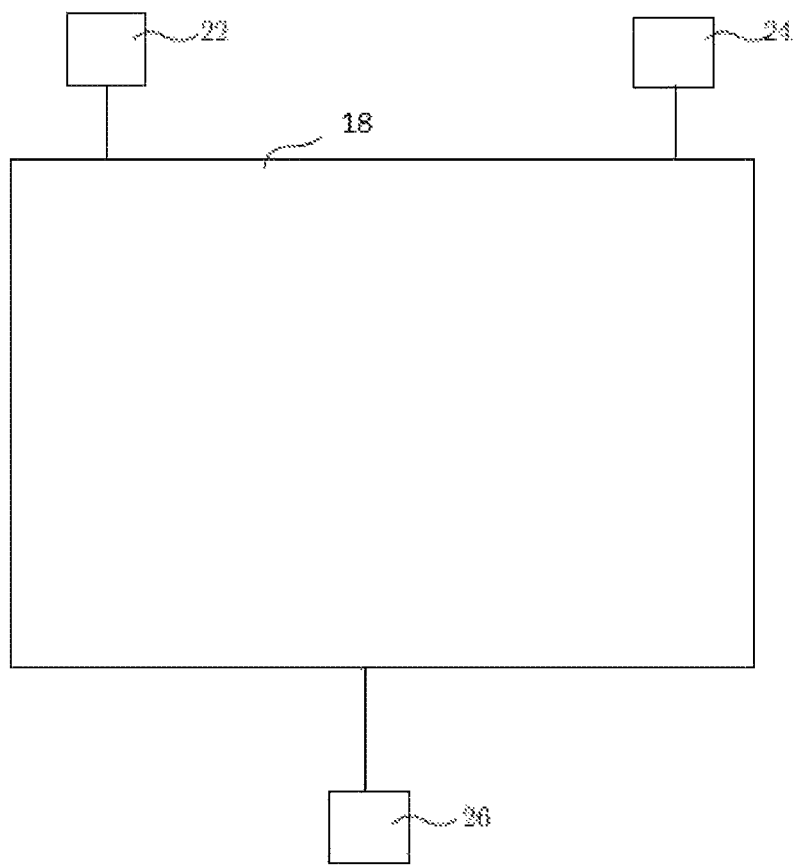
FIG. 1 is a block diagram illustrating an overview of a super hub system of the present invention.

FIG. 1 shows an overview of a super hub system 18 having a first port 22, a second port 24 and a third port 26, which are all configured to connect to electronic products. Each port can be either a universal serial bus (USB) port or a Lighting port from Apple Inc. or any other known computer bus. The super hub system 18 transfers at least electric power and optionally data between the ports. The super hub system 18 is configured to decide and set the ports as master or slave. In one example, the super hub system 18 perform "hot swap". "Hot swap" lets the super hub system 18 intelligently, automatically and internally swapping the ports between master and slave for at least one time while the electronic products connected to them are staying in the same ports during power routing and optionally data communications. 'Hot swap" further allows the super hub system 18 intelligently, automatically and internally swapping the ports between master and slave when a particular electronic product connected to one of the ports of the super hub system 18 is replaced by another particular electronic product during power routing and optionally data communications. The super hub system 18 may include an internal battery.

First Version Super Hub System

Figure 2:
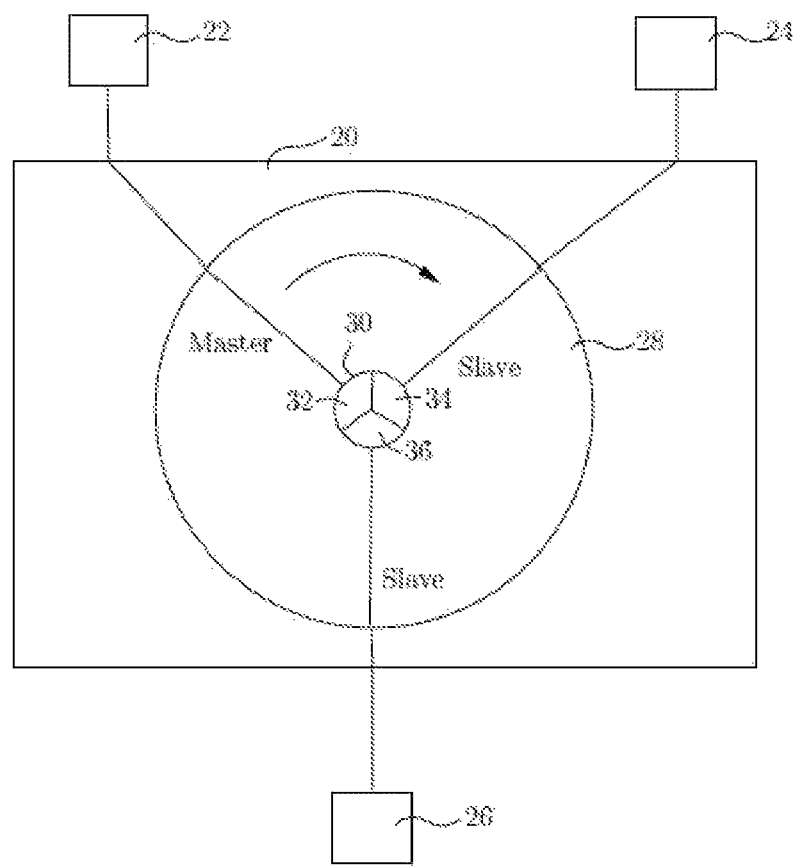
FIG. 2 is an exemplary block diagram illustrating one embodiment of the first version super hub system of the present invention.

In the first embodiment of the first version super hub system of the present invention as shown in FIG. 2, the first version super hub system 20 includes a switch 28 and a rotatable hub 30 having an upstream handler 32, a first downstream handler 34 and a second downstream handler 36. The upstream handler 32 is configured to transfer electric power and optionally data to the first downstream handler 34 and the second downstream handler 36. Data can be transferred bi-directionally. The switch 28, which is controlled by a controller (not shown), is configured to selectively establish a connecting route (for at least electric power and optionally data) between any port and either the upstream handler 32, the first downstream handler 34 and the second downstream handler 36. The port connecting the upstream handler 32 is labeled as master and the ports connecting the first downstream handler 34 and second downstream handler 36 are labeled as slaves. In this particular embodiment, both the switch 28 and the rotatable hub 30 are rotatable and the rotatable hub 30 rotates at the same rate as the switch 28. The switch 28 further has three connecting points to make connections with all the ports at the same time. The rotatable hub 30 further includes a detecting unit (not shown) (e.g. detector) to at least detect the electronic products connected to the third port 26. The detector is further connected to the controller.

Figure 3:
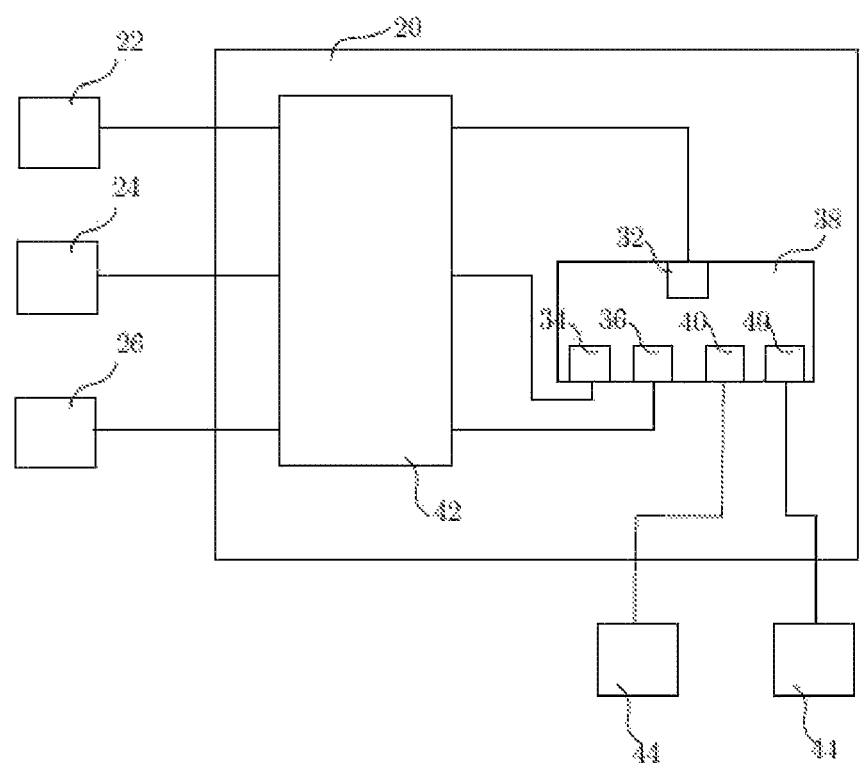
FIG. 3 is an exemplary block diagram illustrating second embodiment of the first version super hub system of the present invention.

In the second embodiment of the first version super hub system of the present invention as shown in FIG. 3, the first version super hub system 20 includes a matrix switch 42 and a hub 38. The hub 38 includes the upstream handler 32, first downstream handler 34, second downstream handler 36 and two standalone downstream handlers 40. The upstream handler 32 is configured to transfer electric power and optionally data to the first downstream handler 34, the second downstream handler 36 and the two standalone downstream handlers 40. Data can be transferred bi-directionally. The first version super hub system 20 further includes two connectors 44, which are connected to the two standalone downstream handlers 40. The two standalone downstream handlers 40 transfer power and optionally data to the two connectors 44. Each connector 44 can be either a universal serial bus (USB) connector or a Lighting connector from Apple Inc. or any other known computer bus. The matrix switch 42 includes three input terminals and three output terminals. The input terminals are connected to the first port 22, the second port 24 and the third port while the output terminals are connected to the upstream handler 32, the first downstream handler 34 and the second downstream handler 36. The matrix switch 42, which is controlled by a controller (not shown), is configured to selectively establish a connecting route (for at least electric power and optionally data) between any port and either the upstream handler 32, the first downstream handler 34 and the second downstream handler 36. The port connecting the upstream handler 32 is labeled as master and the ports connecting the first downstream handler 34 and second downstream handler 36 are labeled as slaves. The matrix switch 42 further includes a detecting unit (not shown) (e.g. detector) to at least detect the electronic products connected to the third port 26. The detector is further connected to the controller. Since the connectors 44 are directly connected to the two standalone downstream handlers 40, the connectors 44 are always labeled as slaves.

Figure 4:
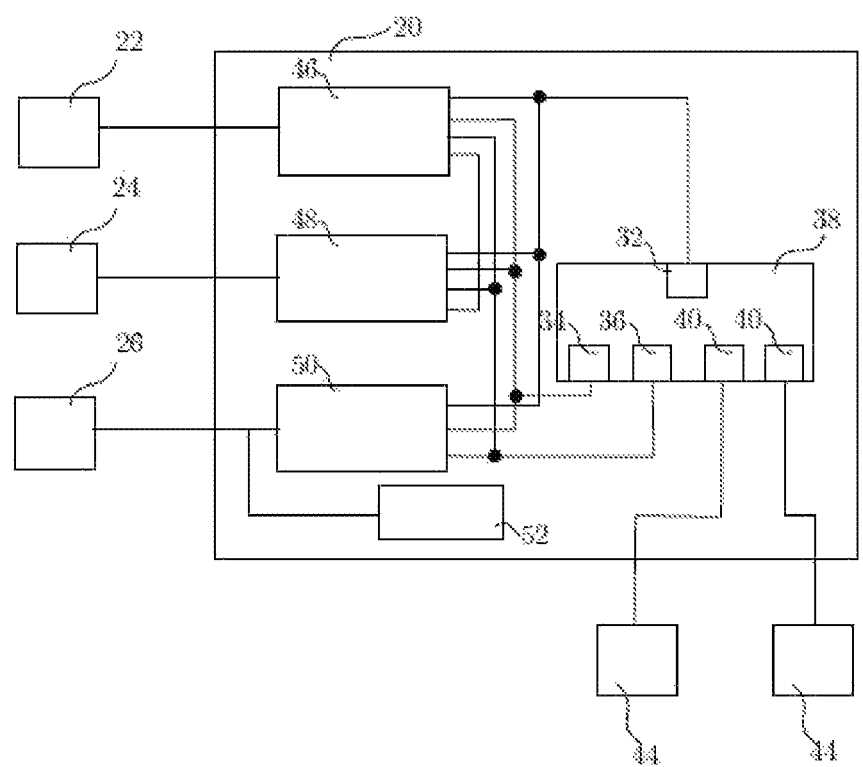
FIG. 4 is an exemplary block diagram illustrating third embodiment of the first version super hub system of the present invention.

In the third embodiment of the first version super hub system of the present invention as shown in FIG. 4, the first version super hub system 20 includes a first multiplexer 46, a second multiplexer 48, a third multiplexer 50, a detector 52, the hub 38 and the two connectors 44. In this embodiment, the hub 38 and the connectors 44 are identical to the hub 38 and the connectors 44 as mentioned in the second embodiment. The first port 22, second port 24 and third port 26 are connected to the first multiplexer 46, the second multiplexer 48 and the third multiplexer 50 respectively. Each multiplexer has four first terminals and one second terminal. The second terminal of each multiplexer is connected to its respective port. Three of the four first terminals of each multiplexer are connected to the upstream handler 32, the first downstream handler 34 and the second downstream handler 36 respectively. The first multiplexer 46 and the second multiplexer 48 are further connected to each other via their respective fourth first terminals as shown in FIG. 4 such that electric power and optionally data can be directly transferred between the first port 22 and the second port 24. Electric power from the connected electronic products can be saved by this configuration as no power is drawn by the hub 38 during the direct transfer of electric power and optionally data between the first port 22 and the second port 24. For clarity, the fourth first terminal of the third multiplexer 50 is not shown in FIG. 4. The detector 52 is connected to the third port 26 to determine what kind of electronic product is connected to the third port 26. Each multiplexer, which is controlled by a controller (not shown), is configured to selectively establish connecting routes (for at least electric power and optionally data) between its connected ports and either the upstream handler 32 or the first downstream handler 34 and the second downstream handler 36 as shown in FIG. 4. The port connecting the upstream handler 32 is labeled as master and the ports connecting the first downstream handler 34 and second downstream handler 36 are labeled as slaves. In one specific embodiment, the detector 52 is integrated into the controller. In another embodiment, the detector 52 is further connected to the first port 22 and/or second port 24. In another embodiment, the detector 52 is further connected to a detector multiplexer (not shown) which is further connected to all the ports. As such, the single detector 52 can selectively be connected to each of the ports. In yet another specific embodiment, each port is further connected to its respective detector for detecting what kind of electronic product is connected to its respective port. In one specific embodiment, the first port 22 is connected to a phone plug in detector to determine whether a phone is connected to the first port 22.

Figure 5:
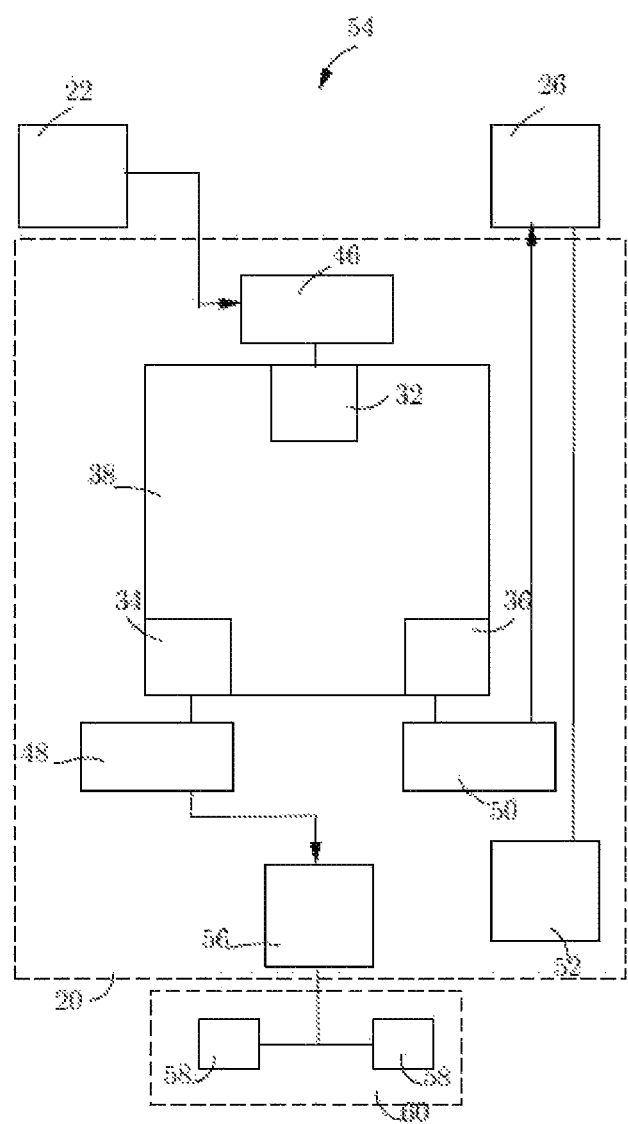
FIG. 5 is an exemplary block diagram illustrating fourth embodiment of the first version super hub system of the present invention.

In the fourth embodiment of the first version super hub system of the present invention as shown in FIG. 5, the first version super hub system 20 is realized within a first peripheral device/apparatus 54 which can be attached to a portable device (another peripheral device/apparatus with a second version super hub system 88 is named a second peripheral device/apparatus 102 and described in another section). In one embodiment, the first peripheral device/apparatus is a portable charger or a protective case. The portable charger or a protective case for a portable device includes a modules docking hub 60 and the first version super hub system 20 which further includes a first multiplexer 46, a second multiplexer 48, a third multiplexer 50, a detector 52, the hub 38, and a controller 56. If the first peripheral device/apparatus 54 is a portable charger, an extra rechargeable battery (not shown) will be included in the first peripheral device/apparatus 54 or the super hub system 20. The modules docking hub 60 is configured to receive a plurality of modules 58. The modules 58 have their unique functions and can include, but not limited to, either sensor(s), actuator(s), battery pack(s) or the combination thereof. The connections between the modules 58 and the modules docking hub 60 can be USB, Lighting port from Apple Inc. or any known computer bus. The hub 38, the first multiplexer 46, the second multiplexer 48, the third multiplexer 50, and the detector 52, which are connected to the controller 56, within the first version super hub system 20 are identical to those as mentioned in the third embodiment. The first multiplexer 46 and the second multiplexer 48 are further connected to each other (not shown in FIG. 5). A first port 22, a second port (not shown) and a third port 26 are connected to the first multiplexer 46, the second multiplexer 48 and the third multiplexer 50 respectively. The second port is directly connected to the modules docking hub 60 and is further connected to the second multiplexer 48 through the controller 56. The second multiplexer 48 is connected to the modules docking hub 60 through the controller 56. The controller 56 of this embodiment acts as gateway between the second multiplexer 48 and the modules docking hub 60, as such the controller 56 can set the status of the modules docking hub 60 as a host (master) or a client (slave) while it can always act as master for the modules. The controller 56 further is configured to control the first multiplexer 46, the second multiplexer 48, the third multiplexer 50 to selectively establish a connecting route between one of ports 22, 26 or the second port/modules docking hub 60 to either the upstream handler 32, or the first downstream handler 34 or the second downstream handler 36. The port or second port/modules docking hub 60 connecting the upstream handler 32 is labeled as master and the ports or second port/ modules docking hub 60 connecting the first downstream handler 34 and second downstream handler 36 are labeled as slaves. The detector 52 is connected to the third port 26. The detector 52 is configured to detect what kind of electronic product is connected to the third port 26. In one specific embodiment, the detector 52 is integrated into the controller. In another embodiment, the detector 52 is further connected to the first port 22 and/or second port/modules docking hub 60. In another embodiment, the detector 52 is further connected to a detector multiplexer (not shown) which is further connected to all the ports. As such, the single detector 52 can selectively be connected to each of the ports. In yet another specific embodiment, each port is further connected to its respective detector for determine what kind of electronic product is connected to its respective port. Please be noted that FIG. 5 only shows one such connection configuration for clarity purpose. That is: first multiplexer 46 is connected to upstream handler 32 but in actual implementation, there are also electrical connections between the first multiplexer 46 and the first downstream handler 34 and the second downstream handler 36. Similarly, the second multiplexer 48 and the third multiplexer 50 are also connected to the upstream handler 32, the first downstream handler 34 and the second downstream handler 36.

Figure 6:
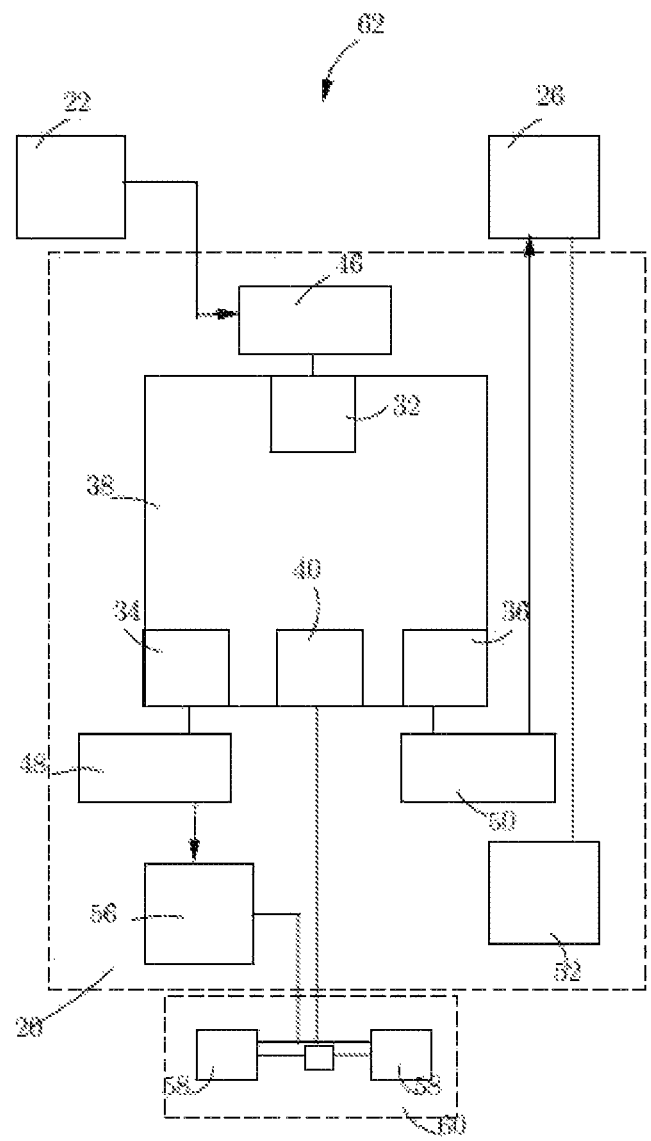
FIG. 6 is an exemplary block diagram illustrating fifth embodiment of the first version super hub system of the present invention.

In the fifth embodiment of the first version super hub system of the present invention as shown in FIG. 6 is a variation of the first peripheral device/apparatus 62. The variation of the first peripheral device/apparatus 62 of this embodiment is similar to the first peripheral device/apparatus 54 as shown in the fourth embodiment. However, it further includes a standalone downstream handler 40 which is directly connected to the modules docking hub 60 at a modules connection hub within the modules docking hub 60. The modules connection hub acts as a hub for the communication between the connected module(s) and the standalone downstream handler 40. The connection between the modules docking hub 60 and the standalone downstream handler 40 can be USB, Lighting from Apple Inc. or any known computer bus. The controller 56 is further connected to the modules docking hub 60 through SPI (Serial Peripheral Interface) and/or MIPI (Mobile Industry Processor Interface), or any other known computer bus.

The system (e.g. the embodiments as suggested above) generally comprises memory, which may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms. The memory contains a computer readable program when executed by the controller 56, which can be a central processing unit (CPU), causes the controller 56 executes at least part of the steps as stated below. The controller 56 gives and receives signals to and from the detectors and the multiplexers for executing the actions as stated above and the operations as stated below.

The first version super hub system 20 can operate according to one embodiment of the present invention with any port being connected to either nothing or an electronic product selected from a group consisting of a portable device (with or without internal battery), a master electronic device (e.g. an electronic device that always acts as a master, for example, desktop or laptop computer), a power supply (e.g. charger or battery charger), an accessory (e.g. USB flash drive, keyboard, and mouse) or the modules docking hub 60 (with or without battery module therein). The first version super hub system 20 of the present invention based on what its ports are connected to, selectively establishes connecting routes between its connected ports and either the upstream handler 32 or the first downstream handler 34 and the second downstream handler 36. The port connecting the upstream handler 32 is labeled as master and the ports connecting the first downstream handler 34 and second downstream handler 36 are labeled as slaves. The connecting routes are used to transfer electric power and optionally data.

For data communication/transfer, the priority of selecting which port is master (data-master) is ranked as follows. The highest priority is given to the port that is connected to a master electronic device (e.g. an electronic device that always acts as master, for example, desktop or laptop computer). Then the second priority is given to the port that is connected to a portable device that is in docking mode if the portable device supports docking mode. Further, the third priority is given to the port that is connected to a portable device that is acting as a host (master). The condition for the third priority is that there has to be no connection between the power supply and the super hub system 20. Further, the modules docking hub 60 connected does not have a battery module therein as well. The lowest priority is given to the port that is connected to the modules docking hub 60. The condition is that either no portable device is connected to the first version super hub system 20 or the portable device does not support docking mode and the battery level of the portable device is low (e.g. <5%). The priority of selecting which port as master is summarized in table 1.

TABLE 1

| Master Priority | Port connected to | Condition |
|---|---|---|
| 1 | master electronic device (e.g. an electronic device that always acts as master, for example, personal computer) | if the master electronic device (e.g. an electronic device that always acts as master, for example, desktop or laptop computer) is connected |

TABLE 1-continued

| Master Priority | Port connected to | Condition |
|---|---|---|
| 2 | portable device (as docking master) | if the portable device supports docking mode |
| 3 | portable device (as normal master) | if no power supply is connected AND a modules docking hub 60 does not have battery module therein |
| 4 | modules docking hub 60 | if (1) the portable device does not support docking mode AND the battery level of the portable device is low (e.g. <5%); OR (2) no portable device is connected |

If two or more similar or identical electronic products are connected to the ports of the first version super hub system 20 (for example, a desktop computer and a laptop computer or two portable devices), then the user will determine which port will become the master.

For power routing, a table illustrating the power output priority (the priority of selecting which port as master for supplying power when two or more devices as listed under "power output priority" in FIG. 7 are connected to the ports) and power input priority (the priority of port(s) receiving power from the master port; note: the port(s) receiving power from the master is labeled as slave(s)) in accordance with the same embodiment of the present invention is shown in FIG. 7. As previously defined at the beginning of this section, "master" and "slave" in the following paragraphs that describe FIG. 7 refer to "power-master" and "power-slave". The priority of selecting which port as master for supplying power is ranked (from highest to the lowest) as follow: from the port that is connected to (1) the power supply, (2) the master electronic device (e.g. an electronic device that always acts as master, for example, desktop or laptop computer), (3) the modules docking hub 60 with battery module therein, (4) the internal battery of the super hub system 20, and (5) the internal battery of the portable device. The internal battery of the first version super hub system 20 is used if either (a) the portable device is not supporting docking mode and its internal battery needs to get charged and the controller 56 of the system 20 is connected or (b) no portable device is connected to the first version super hub system 20 and the controller 56 is not sleeping and there is two active ports.

For the first priority as mentioned above (Case I): when the port, that is connected to the power supply, is selected as a master for supplying power, the power is supplied to the following device according to the following priority (from highest to lowest) (1) the portable device to charge its internal battery until its battery level reaches 10%, (2) the first version super hub system 20 to charge its internal battery until 100 mAh, (3) any electronic product that is connected to the super hub system 20, (4) the portable device to charge its internal battery until it is full, (5) the first version super hub system 20 to charge the internal battery until full and (6) any battery module connected to the modules docking hub 60 until it is full (if there is more than one battery modules connected, the charging priority should start from the battery module having highest battery percentage among the connected battery modules).

For the second priority as mentioned above (Case II): when the port, that is connected to the master electronic device (e.g. an electronic device that always acts as master, for example, desktop or laptop computer), is selected as a master for supplying power, the power is supplied to the following device according to the following priority (from highest to lowest) (1) the portable device to charge its internal battery until its battery level reaches 10%, (2) the first version super hub system 20 to charge the internal battery until 100 mAh, (3) any electronic product that is connected to the super hub system 20, (4) the portable device to charge its internal battery until it is full, (5) the first version super hub system 20 to charge the internal battery until full and (6) any battery module connected to the modules docking hub 60.

For the third priority as mentioned above (Case III): when the port, that is connected to the modules docking hub 60 with battery module therein, is selected as a master for supplying power, the power is supplied to the following device according to the following priority (from highest to lowest) (1) the portable device to charge its internal battery until its battery level reaches 10% (only if the maximum output current of the battery module in the modules docking hub 60 is high enough; otherwise power only a part of it or skip it or combine it with other power source), (2) the first version super hub system 20 to charge the internal battery until to 100 mAh, (3) any electronic product that is connected to the first version super hub system 20 (only if the maximum output current of the battery module in the modules docking hub 60 is high enough; otherwise power only part of it or skip it or combine it with other power source; further, the user can choose whether the power should be supplied to any electronic product that is connected to the super hub system 20), and (4) the portable device to charge its internal battery until it is full. In one embodiment, the battery module connected to the modules docking hub 60 may contain a plurality of battery modules. In this case, the power will be drawn from the battery module with the lowest battery level first until it reaches 5% before drawing power from the battery module with the higher battery level until it reaches 5%.

For the fourth priority as mentioned above (Case IV): when the port, that is connected to the internal battery of the super hub system 20, is selected as a master for supplying power, the power is supplied to the following device according to the following priority (from highest to lowest) (1) the portable device to charge its internal battery until its battery level reaches 10%, (2) any electronic product that is connected to the first version super hub system 20 (until the internal battery of the first version super hub system 20 is equal or less than 100 mAh), and (3) the portable device to charge its internal battery until it is full (until the internal battery of the first version super hub system 20 is equal or less than 100 mAh). The power is supplied as discussed in case IV only if the maximum output current of the internal battery of the first version super hub system 20 is high enough; otherwise power only part of it or skip it or combine it with other power source.

For the fifth priority as mentioned above (Case V): when the port, that is connected to the internal battery of the portable device, is selected as a master for supplying power, the power is supplied to the following device according to the following priority (from highest to lowest) (1) the first version super hub system 20 to charge the internal battery until 100 mAh, and (2) any electronic product that is connected to the super hub system 20. Case V continues to run until the battery level of the internal battery of the portable device falls below a certain threshold (e.g. equal or less than 20%).

The following is an example showing the operation of the first version super hub system 20 in terms of power routing under different scenarios. In this example, the first version super hub system 20 starts its operation by drawing the power from the internal battery of the super hub system 20, the power will be supplied as shown in case IV. If the internal battery of the first version super hub system 20 is used up or the battery level of the internal battery of the first version super hub system 20 drops below a level (e.g. below 5%), the first version super hub system 20 will draw the power from the internal battery of the portable device. The power will be supplied as shown in case V. If the first version super hub system 20 then is connected to a power supply, the super hub system will draw the power from the power supply and the power will be supplied as shown in case I.

The first version super hub system 20 can also operate according to another particular exemplary embodiment of the present invention. In this embodiment, the first port 22 and the second port 24 are connected to a portable device and a modules docking hub 60. The portable device, which can be a smartphone, can be set in either one of the three modes, namely master, slave and docking mode. The portable device usually includes at least one rechargeable battery within the device. The third port 26 is left open for a connection to an external device. An external device is selected from a group consisting of master electronic devices, power supplies and electronic accessories.

In this particular exemplary embodiment, the power logic is as follows. The first version super hub system 20 first draws the power from any potential available power source by pure hardware (without any software or controller running) to wake itself up. The potential available power source can be from the internal battery of the modules docking hub 60, the battery module connected to the modules docking hub 60, an internal battery of the portable device, the master electronic device and/or the power supply. After the first version super hub system 20 wakes up, it first detects if there is any power supply connected to the third port 26. If a power supply is connected to the third port 26, the first version super hub system 20 then detects (1) if the battery level in the portable device is less than 100% and (2) if there is battery module in the modules docking hub 60 or any internal battery within the super hub system 20. For (1), if the battery level in the portable device is less than 100%, the power supply will supply power to the portable device to charge the battery therein. If otherwise, the battery of the portable device will not be charged and the portable device will not supply any power to the super hub system 20. For (2), if there is at least one battery module in the modules docking hub 60, the first version super hub system 20 will determine if battery level in the battery module has less than 100%. If it is less than 100%, the power supply will supply power to the modules docking hub 60 to charge the battery module. Otherwise, the battery module of the modules docking hub 60 is not charged and the modules docking hub 60 does not supply any power to the super hub system 20. In this case, the charger will be the power supplying master.

If no power supply is connected to the third port 26, the first version super hub system 20 will detect if there is battery module in the modules docking hub 60 or any internal battery within the super hub system 20. If there is no battery module in the modules docking hub 60, the phone will be the master for supplying the power.

If there is battery module in the modules docking hub 60 or any internal battery within the super hub system 20, the first version super hub system 20 will detect if the battery module or the internal battery has a battery level that is higher than 5%. If yes, the modules docking hub 60 will be the master for supplying power and the battery within the portable device will be charged. If no, the phone will be the master for supplying the power.

There are two special cases for the operation of the first version super hub system 20 in this particular exemplary embodiment. The first one is when the first version super hub system 20 acts as a fake master. In this case, the first version super hub system 20 receives power from the power supply and use the power from the power supply to provide power to other ports while pretending itself as a master. The second one is when the portable device is in docking mode. In the docking mode, the portable device is master (as such the port connected thereto will be assigned as master) while the portable device receives power.

Figure 8:
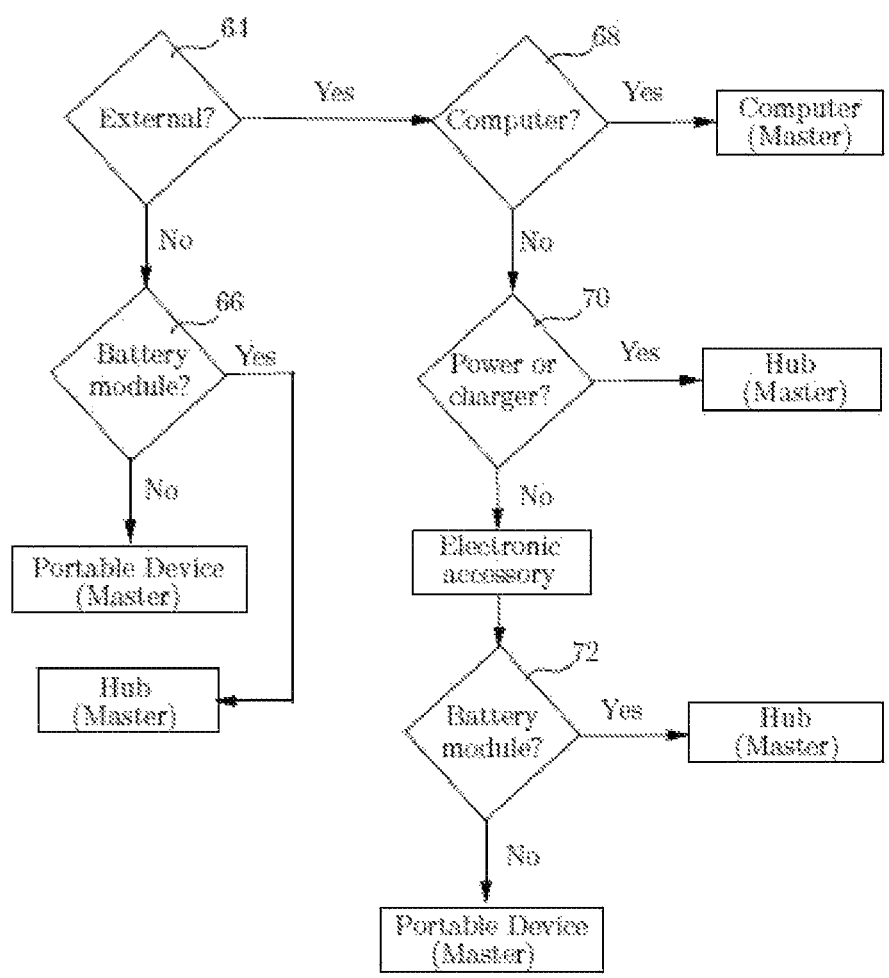
FIG. 8 is an exemplary flowchart illustrating an operation of the super hub system according to one exemplary embodiment of the first version super hub system of the present invention.

FIG. 8 shows a flowchart according to yet another embodiment of the present invention to determine which one of the ports is master and which ports are slaves for power routing. As previously defined at the beginning of this section, "master" and "slave" in the following paragraphs that describe FIG. 8 refer to "power-master" and "power-slave". In order to determine the aforesaid, the controller 56 of the first version super hub system 20 first check if the third port 26 is connected to any external device in step 64. Please note that the information of whether the third port 26 is connected to any external device or what kind of external device is connected to the third port (if an external device is connected) is fed from the detector 52 to the controller 56. After receiving the information, the controller then performs the followings based on the information given. After the checking step 64, if the third port 26 is not connected to any external device, the first version super hub system 20 then detects if a battery module is docked at the modules docking hub 60 in step 66 (if it is connected to the port). If there is a battery module docked at the modules docking hub 60 and connected to the super hub system 20, the first version super hub system 20 will then determine the port that connects to the modules docking hub 60 itself as master. In this case, the power will be supplied from the battery module to the portable device through the modules docking hub 60 if the electric level in the battery module is equal or more than 5% of its full capacity. The power supplied to the portable device will be used to charge the battery within therein. If the battery module has less than 5% of its capacity, the portable device will provide power to itself and the modules docking hub 60. If there is no battery module docked at the modules docking hub 60, the port connecting the portable device will become master. The portable device will supply power to itself and the modules docking hub 60.

If there is an external device connected to the third port 26 and the external device connected is a computer, the first version super hub system 20 will set the third port 26 as master in step 68. In this case, the power will be supplied from the computer to the portable device and the modules docking hub 60. If the external device connected to the third port 26 is a power supply, the first version super hub system 20 will set the port connecting to the modules docking hub 60 itself as master and remaining ports as slaves in step 70. Since a power supply does not have any intelligence, the first version super hub system 20 only allows the pure power supply unit to provide power to the modules docking hub 60 and the portable device but not setting the port which connects to the power supply as master. The power supply in this case will charge the battery within the portable device and the battery module (if any) docked to the modules docking hub 60 if they are not full. If the external device is the electronic accessory, the third port 26 will not be set as master. The first version super hub system 20 determines whether the port connecting to the modules docking hub 60 or the port connecting to the portable device is the master in step 72. The step 72 determines if there is a battery module docked at the modules docking hub 60 and connected to the super hub system 20. If that is the case, the first version super hub system 20 will then determine the port that connects to the modules docking hub 60 as master. In this case, the power will be supplied from the battery module to the modules docking hub 60 to the portable device and the electronic accessory if the battery module has equal or more than 5% of battery. The power supplied to the portable device will be used to charge the battery within the device. If the battery module has less than 5% of battery, the portable device will provide power to itself, the electronic accessory and the modules docking hub 60. If there is no battery module docked at the modules docking hub 60, the port connecting the portable device will become master. The portable device will supply power to itself, the electronic accessory and the modules docking hub 60. More than one battery module can be docked at the modules docking hub 60.

Figure 9:
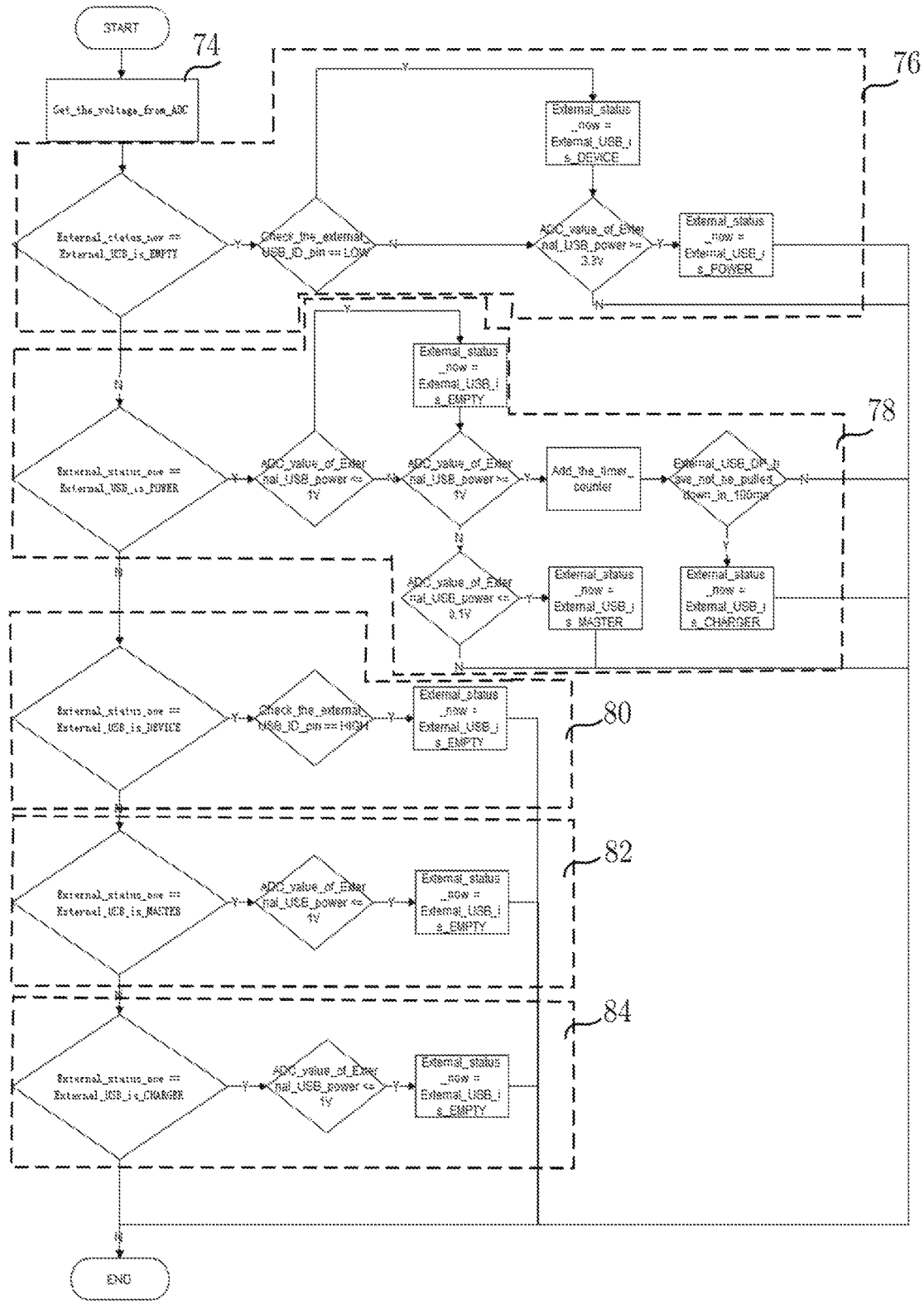
FIG. 9 is an exemplary flowchart illustrating an operation of the detector the super hub system according to one embodiment of the first version super hub system of the present invention.

FIG. 9 shows a flowchart illustrating an example of an operation of the detector 52 which is connected to a USB port. It indicates the steps on how the detector 52 determines whether the third port 26 is connected to any external device or what kind of external device is connected to the third port 26 (if an external device is connected). The detector 52 is configured to assign a label to the external device, which will be used to determine whether the third port 26 is connected to any external device or what kind of external device is connected to the third port 26 (if an external device is connected). There are, for example, five labels for the external device namely, (1) empty, (2) power, (3) device, (4) master and (5) charger. The empty label means that there is nothing connected to the port which the detector 52 detects ("Detected Port"). The power label means that a power source is connected to the Detected Port. The device label means that the electronic accessory is connected to the Detected Port. The master label means that a computer is connected to the Detected Port. Lastly, the charger label means that a charger is connected to the Detected Port.

First the detector 52 obtains a voltage (at least one voltage level) from an analog to digital ("ADC") from at least one USB pins (e.g. power pin, ID pin, etc) (e.g. the detector 52 obtains power reading from a power pin) in step 74 for assigning an initial label to the external device based on the obtained voltage.

If the initial label of empty is selected, step 76 will be performed to assign a final label to the external device and give a final determination of the external device. In step 76, the detector 52 first checks if the USB ID pin of the external device is low. If it is low, a device label to the external device will be assigned. Then the USB power from the external device is checked to see if it is greater than or equal to 3.3V. If it is not the case, the device label will be set to the external device and the external device will be determined as the electronic accessory. If it is the case, a new power label will be assigned to the external device and the external device will be determined as the power source. If the USB ID pin of the external device is not equal to low, the detector 52 then checks the USB power from the external device from the ADC to see if it is greater than or equal to 3.3V. If that is the case, a power label will be assigned to the external device and the external device will be determined as the power source. Otherwise, the device label is set to the external device and the external device is determined as the electronic accessory.

If the initial label of power is selected, step 78 is performed. First, checks if the USB power from the external device from the ADC is less than or equal to 3.3V. If it is the case, empty label will be assigned. Then, a second test will be performed. In the second test, the USB power from the external device from the ADC is checked to see if it is greater than or equal to 1V in the second test. If it is not the case in the first step, the second test will be performed directly. If the USB power from the external device from the ADC is not greater than or equal to 1V (i.e. "no' for the second test), then the USB power from the external device from the ADC will be checked to see if it is less than or equal to 0.1V. If it is the case, a new master label will be assigned to the external device and the device will be determined as computer. If it is not the case, the respective assigned label will not be changed and the external device will be determined as either none or power source depending on the result in the first step. If in the second test, the USB power from the external device from the ADC is greater than or equal to 1V (i.e. "yes" in the second test), the USB DP of the external device will be checked to see if it has not be pulled down in 100 ms. If it is not the case, the respective assigned label will not be changed and the external device will be determined as either none or power source depending on the result in the first step. If it is the case, a new charger label will be assigned and the external device will be determined as a charger.

If the initial label of device is selected, step 80 will be performed. First, the detector 52 checks if the USB ID pin of the external device is high. If it is the case, a new empty label will be assigned and the external device will be determined as none. If it is not the case, the external device will be determined as the electronic accessory.

If the initial label of master is selected, step 82 will be performed. First, check if the USB power from the external device from the ADC is greater than or equal to 1V. If it is the case, a new empty label will be assigned and the external device will be determined as none. If it is not the case, the external device will be determined as the computer.

If the initial label of charger is selected, step 84 will be performed. First, check if the USB power from the external device from the ADC is greater than or equal to 1V. If it is the case, a new empty label will be assigned and the external device will be determined as none. If it is not the case, the external device will be determined as the charger.

Second Version Super Hub System

Figure 10:
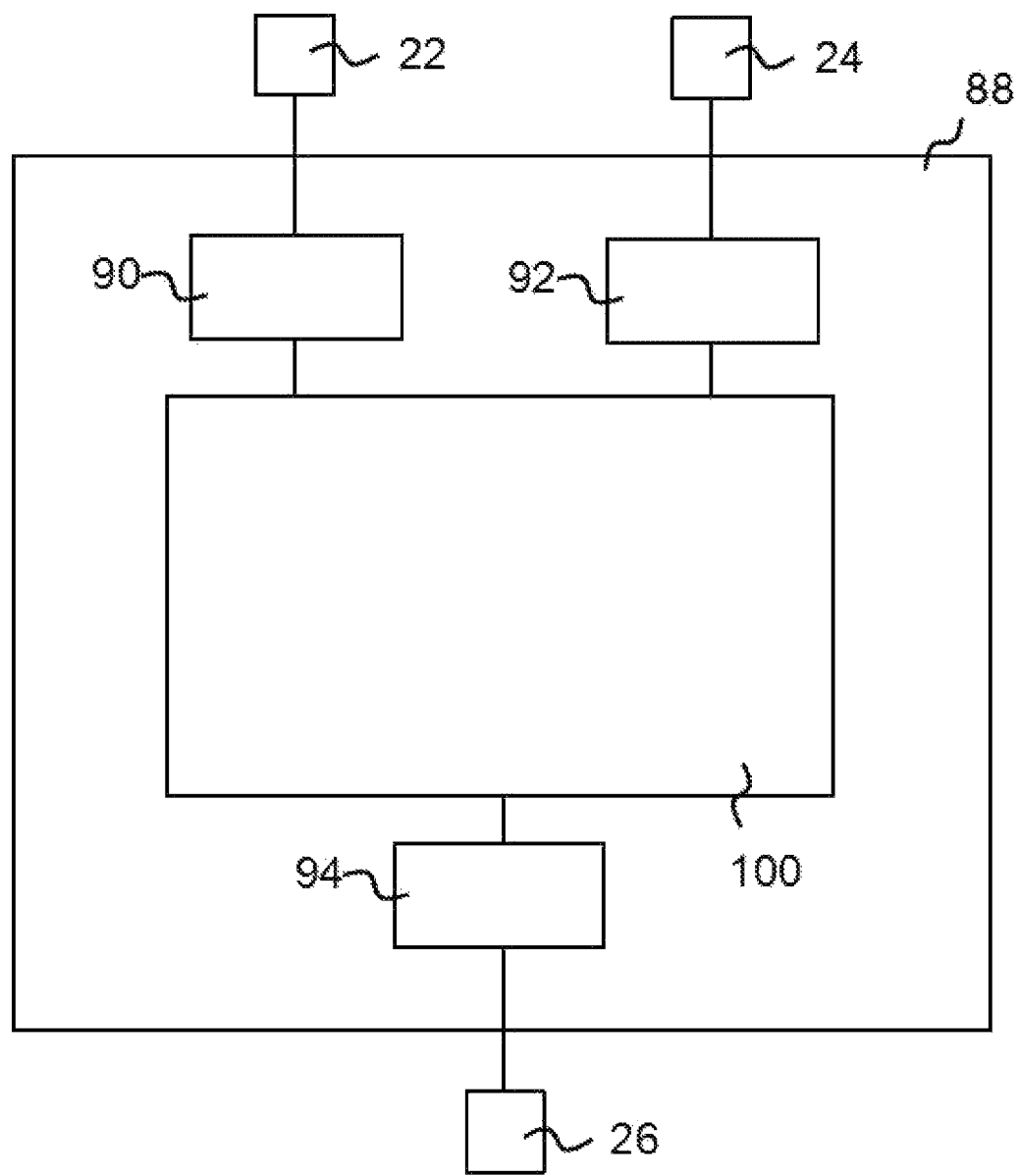
FIG. 10 is an exemplary block diagram illustrating one embodiment of the second version super hub system of the present invention.

In the first embodiment of the second version super hub system of the present invention as shown in FIG. 10, the second version super hub system 88 includes a first gateway 90, a second gateway 92, a third gateway 94 and a control system 100. The first port 22, second port 24 and third port 26 are connected to the first gateway 90, the second gateway 92, and the third gateway 94, respectively. The first gateway 90, the second gateway 92, and the third gateway 94 are further connected to the control system 100. The ports can be a universal serial bus (USB) port, a Lighting port from Apple Inc., an Ethernet port, a controller area network (CAN) port, a pin connector or any other known computer bus. The gateways are configured to transfer at least power and/or data to the external electronic products connected to the ports. The gateways communicate with the electronic device connected to the corresponding port, buffer the information inside the gateway and either process the data or transfer the data to another port through the corresponding gateway of that port. The control system 100 oversees both the power routing and optionally data communication with each connected electronic product. For data communication, it needs to understand what data format it is and to which other party it is to send to. It will perform data protocol conversion if necessary. For example, if port 22 is a USB port and port 24 is an Ethernet port, then the control system 100 will perform USB protocol to Ethernet protocol conversion internally when data is sent/received from both ports. The control system 100 needs to receive and unpack every data packet that it receives from the sending party and then pack it again in a protocol format that is used by the receiving party. At least the header of each package needs to be understood. In one embodiment, the control system 100 further includes a non-transitory computer readable medium to store computer readable codes such that when it is executed by the microprocessor, it gives signals and controls to all the components of the second version super hub system 88 to perform and operate certain steps. The non-transitory computer readable medium may comprise any known type of data storage and/or transmission media, including magnetic media, optical media, random access memory (RAM), read-only memory (ROM), a data cache, a data object, etc. Moreover, memory may reside at a single physical location, comprising one or more types of data storages, or be distributed across a plurality of physical systems in various forms. The second version super hub system 88 of the present invention can intelligently and selectively set each of its gateways as master or slave individually after detecting a slave or master status of the ports. In one example, when a first electronic product is connected to the first port 22, the second version super hub system 88 attempts to detect whether the first electronic product acts as master. If it acts as master, then the second version super hub system 88 configures the first gateway 90 that is connected to the first port 22 to be a slave, so that the second version super hub system 88 can at least route power and optionally perform data communication with the first electronic product. If the first external device acts as a slave, then the corresponding gateway 90 is set as master to ensure that at least power routing and optionally data communication can be properly established. Likewise, the second gateway 92 and third gateway 94 are configured in a similar fashion. As such, the second version super hub system can have multiple power-masters and data-masters. The configuration of the ports is independent from each other. The second version super hub system 88 facilitates at least power routing and optionally data communication among the electronic products by eliminating the hassle of the need for deciding which electronic product should be acted as master, which would require it to be plugged into a specific master port and which electronic product(s) should be acted as slave(s), which would require it/them to be plugged into a slave port(s). Thus an advantage of second version super hub system 88 is to alleviate users' concern whether the electronic product that he wants to connect to the system acts as a master or slave. The user can just plug the electronic product to any port available in the system, and the control system 100 will detect the master/slave status of the electronic device and configure the corresponding gateways according. Simultaneously, the control system 100 also performs any necessary data protocol conversion if necessary to ensure proper data exchange to and from the external electronic products.

Figure 11:
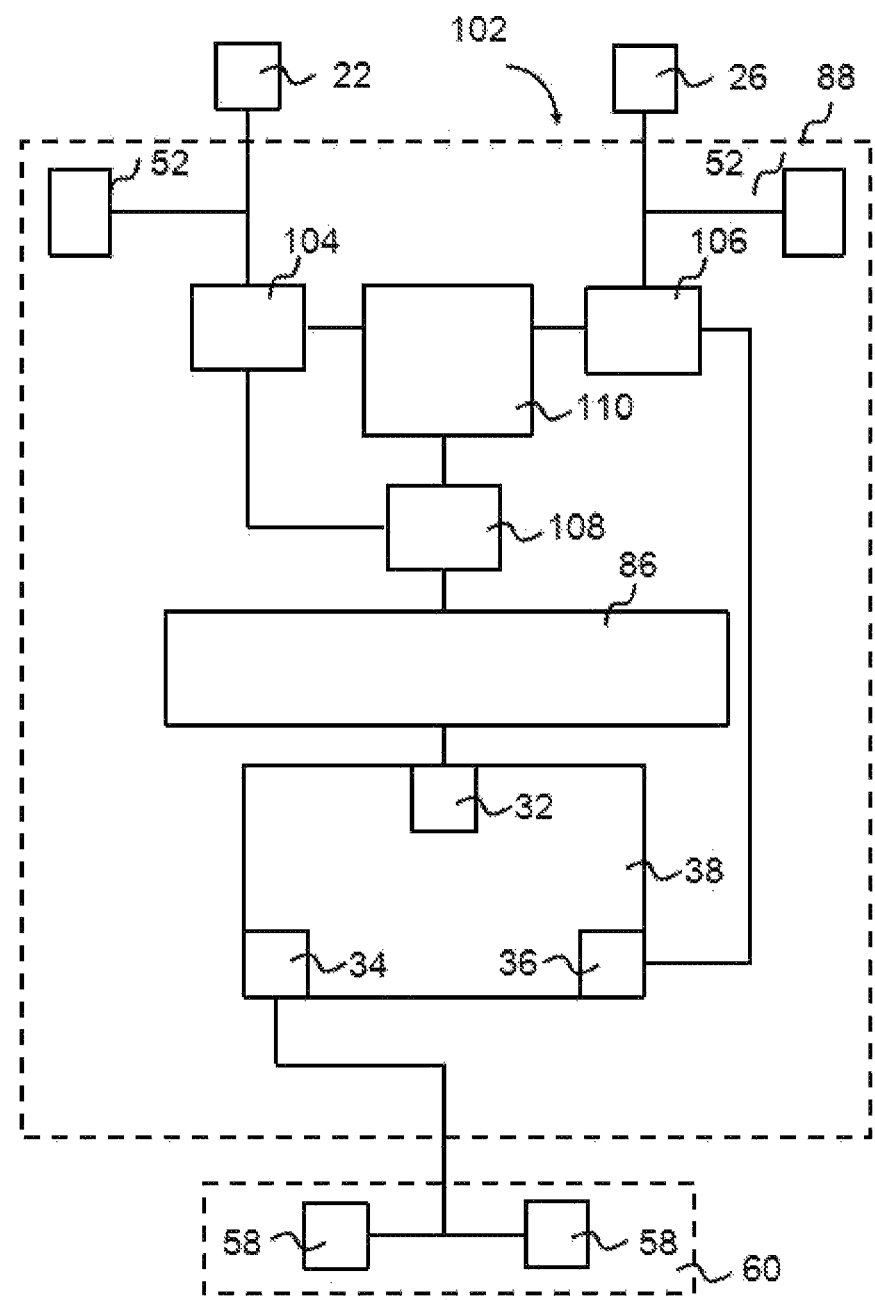
FIG. 11 is exemplary block diagram illustrating second embodiment of the second version super hub system of the present invention.

A specific implementation of the second version super hub system of the present invention is shown in FIG. 11. The second version super hub system 88 is realized within a second peripheral device/apparatus 102 which can be attached to a portable device. In one embodiment, the second peripheral device/apparatus is a portable charger or a protective case. The portable charger or a protective case for a portable device includes a modules docking hub 60 and the second version super hub system 88 which further includes a fourth multiplexer 104, a fifth multiplexer 106, an sixth multiplexer 108, a multiplexer hub 110, two detectors 52, a hub 38, and a control unit 86. The first port 22 and the third port 26 are connected to the fourth multiplexer 104 and the fifth multiplexer 106, respectively. The control unit 86 can be a central process unit (CPU), an application-specific integrated circuit (ASIC), a field-programmable gate array (FPGA) or any other intelligent chips. The hub 38 includes an upstream handler 32, a first downstream handler 34, and a second downstream handler 36. The upstream handler 32 is configured to transfer electric power and optionally data to the first downstream handler 34 and the second downstream handler 36. Data can be transferred bi-directionally among the upstream handler and the downstream handlers. The multiplexer hub 110 is configured to connect to the fourth multiplexer 104, the fifth multiplexer 106 and the sixth multiplexer 108. A direct connecting route between the first port 22 and the third port 26 can be established through the multiplexer hub 110 without going through the control unit if necessary. The fifth multiplexer 106 is further connected to the downstream handler 36. The sixth multiplexer 108 is further connected to the fourth multiplexer 104 and the control unit 86. The control unit 86 is connected to the upstream handler 32. Each of the two detectors 52 is connected to the first port 22 and the third port 26, respectively, to detect what kinds of electronic product are connected to the ports. In one specific embodiment, each of the detectors 52 is integrated into the fourth multiplexer 104 and the fifth multiplexer 106. In another embodiment, the detector 52 is further connected to a detector multiplexer (not shown) which is further connected to all the ports. As such, the single detector 52 can selectively be connected to each of the ports. The second port 24 (shown in FIG. 10) becomes an internal port connecting the modules docking hub 60 to the downstream handler 34 and hence it is not shown in FIG. 11. The modules docking hub 60 is configured to receive a plurality of modules 58. The modules 58 have their unique functions and can include, but not limited to sensor(s), actuator(s), battery pack(s) or the combination thereof. The connections between the modules 58 and the modules docking hub 60 can be USB, Lighting port from Apple Inc. or any known computer bus. If the second peripheral device/apparatus 102 is a portable charger, an extra rechargeable battery (not shown) will be included in the second peripheral device/apparatus 102 or the second version super hub system 88.

Now turn to the operation of the second peripheral device/apparatus 102 of the second embodiment of the second version super hub system of the present invention. The second version super hub system 88 acts as a power routing and optionally data communication hub between the first port 22, second port 24 and the third port 26. The power routed to the ports can be used to provide power to the external electronic product and/or charge any compatible rechargeable battery in any external product connected to the port(s). The second version super hub system 88 of the present invention can intelligently and selectively set the first port 22 and the third port 26 as power-master, power-slave, data-master or data-slave individually and independently of each port after detecting a corresponding slave or master status of the ports via detector 52. The second port 24, which is directly connected to the modules docking hub 60 and is further connected to the downstream handler 34, is always labeled as data-slave because it is connected to the downstream handler. As such, the modules docking hub 60 and the modules 58 therein are always labeled as data-slave. Otherwise, this specific implementation realizes the features and operations of the second version super hub system 88 as mentioned in previous paragraphs. In particular, it will detect the master/slave status of the electronic product(s) connected to port 22 and/or port 26 and establish connecting route for proper data communication and power exchange.

The second version super hub system 88 can operate according to one embodiment of the present invention with any port being connected to either nothing or an electronic product selected from a group consisting of a master electronic device (for example, an electronic device that always acts as a master such as a desktop or laptop computer), a power supply (e.g. charger or battery charger), a portable device (e.g. a smartphone with Android or iOS operating system) or an electronic accessory (e.g. USB flash drive, keyboard, and mouse). The second version super hub system 88 of the present invention can, based on what its ports are connected to, selectively establish connecting routes between its connected ports. The connecting routes are used to transfer electric power and optionally data.

For power routing, the power output priority (the priority of selecting which port as master (power-master) for supplying power) is ranked from the highest to the lowest as follow: from the port that is connected to (1) the power supply, (2) the master electronic device, (3) the modules docking hub with a battery module therein, (4) the internal battery of the second version super hub system 88, and (5) the internal battery of the portable device.

For data communication/transfer, the priority of selecting which port as master (data-master) is ranked from the highest to the lowest as follow: from the port that is connected to (1) the master electronic device, (2) the control unit 86 of the second version super hub system 88, (3) the portable device connected to the second version super hub system 88. A portable device connected to the second version super hub system can act as both power-master and data-slave at the same time. A portable device connected to the port acts as both power-slave and data-slave if the internal battery of the second version super hub system 88 supplies power. If the internal battery of the second version super hub system 88 is used up or the battery level of the internal battery of the second version super hub system 88 drops below a level (i.e. below 5%), then the internal battery of the portable device supplies power, which means that the portable device is the power-master. But the portable device is still data-slave as the second version super hub system 88 is the data-master.

The following is an example showing the operation of the second version super hub system 88 in terms of power routing and data communication/transfer under different scenarios. In this example, the second port 24 of the second version super hub system 88 is connected to a modules docking hub 60. The second version super hub system 88 starts its operation by detecting if there are any electronic products connected to the first port 22 or the third port 26. If no electronic products are connected to the two ports, then the control unit 86 acts as both power-master and data-master. The modules docking hub 60 and all the modules 58 therein are power-slave and data-slave. However, if a battery module is coupled to the modules docking hub 60, then the modules docking hub 60 is power-master and data-slave and the control unit 86 is power-slave and data-master accordingly. If an electronic device that always acts as a master (such as a desktop or a laptop computer) is connected to the first port 22 or the third port 26, then this device is both power-master and data-master. Consequently, the control unit 86 of the second version super hub system 88 is data-slave and the internal battery/the modules docking hub 60 of second version super hub system 88 is power-slave. If a power supply is connected to the first port 22 or the third port 26, then the power supply is power-master and the control unit 86 remains data-master. Consequently, the internal battery of the second version super hub system 88 is power-slave. If an electronic accessory is connected to the first port 22 or the third port 26, then the control unit 86 remains as both power-master and data-master if the modules docking hub 60 has no battery module therein. If an electronic accessory is connected to the first port 22 or the third port 26 and a battery module is coupled to the modules docking hub 60, then the control unit 86 is data-master and the modules docking hub 60 is power-master.

The second version super hub system 88 can also operate according to another exemplary embodiment of the present invention. In this embodiment, the first port 22 and the second port 24 are connected to a portable device and a modules docking hub 60. The portable device usually includes at least one rechargeable battery within the device. The second version super hub system 88 draws the power from its own internal battery or the modules docking hub 60 with a battery module therein. The control unit 86 of the second version super hub system 88 acts as data-master. If the modules docking hub 60 has no battery module therein and the internal battery of the second version super hub system 88 is used up or the battery level of the internal battery drops below a level (e.g. below 5%), the second version super hub system 88 will draw the power from the internal battery of the portable device. Then the portable device acts as power-master and data-slave (the control unit 86 is data-master). The third port 26 is left open for a connection to an external device. An external device is selected from a group consisting of master electronic devices, power supplies and electronic accessories. If the third port 26 of the second version super hub system 88 is connected to an electronic device that always acts as master (such as a desktop or a laptop computer), then this device is both power-master and data-master. Consequently, both the control unit 86 of the second version super hub system 88 and the portable device connected to the first port 22 are set as slave in terms of both power and data. If the third port 26 of the second version super hub system 88 is connected to a power supply, then the power supply is power-master and the control unit 86 of the second version super hub system 88 is the data-master. If the third port 26 of the second version super hub system 88 is connected to an electronic accessory, then the control unit 86 of the second version super hub system 88 is data-master and the modules docking hub 60 with a battery module therein or the internal battery of the second version super hub system 88 is power-master. If the modules docking hub 60 has no battery module therein and the internal battery of the second version super hub system 88 is used up or the battery level of the internal battery of the second version super hub system 88 drops below a level (e.g. below 5%), the second version super hub system 88 will draw the power from the internal battery of the portable device to supply power to the electronic accessory and the system. Then the portable device is both power-master and data-slave (the control unit 86 is data-master).

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown in the accompanying drawing figures shall be interpreted as illustrative only and not in a limiting sense.

The following claims should not be read as limited to the described order or elements unless stated to that effect. Therefore, all statements of the scope of the invention which, as a matter of language, might be said to fall there between.

For example, for the number of ports, connectors, detectors, multiplexers and gateways, any number of ports, connectors, detectors, multiplexers and gateways can be used as long as it does not deviate from the intended purpose of the present invention.

It is noted that although the operation of the detector 52 of the above example used with a USB port, the detection of an electronic product by the detector 52 can also be made for the lighting port and any other known computer bus by certain changes that may be made in the above construction and/or method without departing from the scope (e.g. obtaining appropriate OTG signals or lighting port signals for labeling and determine the external device).

Also, although the specification above for the first super hub system 20 and the second version super hub system 88 only indicates that the first port is connected to the portable device, the second port is connected to modules docking hub and the third port is configured to connect to the external device, the ports can be arbitrarily assigned to portable device, module hub and external device as long as it does not deviate from the intended purpose of the present invention.

Further, the threshold numbers (e.g. battery level that is less than 5% for the first version super hub system 20 and the second version super hub system 88, charging the internal battery of the super hub system till 100 mAh) in the preceding description shall be interpreted as illustrative only and not in a limiting sense. Therefore, the threshold numbers can be different from what is suggested in the preceding description. Furthermore, the ranking of the priority list in terms of data transfer and supplying power for the first version super hub system 20 and the second version super hub system 88 can be adjusted by users and/or manufactures.

What is claimed is:

1. A hub system configured to provide at least power routing and optionally data communications between different electronic products, comprising:
   a) at least two ports configured to connect between said different electronic products;
   b) a hub comprising an upstream handler and at least one downstream handler, wherein said upstream handler is configured to connect said at least one downstream handler inside said hub;
   c) a switch system capable of establishing connecting routes between each said port to said upstream handler or to each of said at least one downstream handler of said hub; and
   d) a controller configured to control said switch, wherein each said connecting route transfers at least electric power and optionally data between said ports and said hub;
   wherein said controller is configured to:
   (i) select one of said port as power master, and
   (ii) control said switch to configure the port selected at (i) as power master by routing it to said upstream handler, and configure each remaining port as power slave by routing each remaining port to one of the said at least one downstream handler, and wherein the selection of one of said ports, and the routing of each remaining port is in accordance with a power output priority and power input priority table.

2. The system of claim 1, wherein said switch comprises a matrix switch having a first predetermined number of inputs and a second predetermined number of outputs.

3. The system of claim 2 wherein said matrix switch further comprises at least three multiplexers, each said multiplexer has a plurality of first terminals and a second terminal; wherein said plurality of first terminals of each said multiplexer are connected to said upstream handler and each said at least one downstream handler and said second terminal of each said multiplexer is connected to one of said ports.

4. The system of claim 3 wherein the number of said multiplexers is the same as the number of said ports.

5. The system of claim 3, wherein two of said at least three multiplexers are further directly connected to each other at their respective first terminals configured to direct transfer at least said electric power and optionally said data between the ports of said two of said at least three multiplexers.

6. The system of claim 3, further comprising at least one detector connected to at least one of said ports through said multiplexer connected to that port, wherein said detector configured to detect said electronic products connected to that port.

7. The system of claim 6, said controller is a microcontroller which connects to said detector and said multiplexers, wherein said microcontroller is configured to send control signals to said multiplexers.

8. The system of claim 7, wherein said device detector is integrated into said microcontroller.

9. The system of claim 1, wherein said at least two ports are Universal Serial Bus (USB) ports or Lighting ports.

10. The system of claim 1, further comprising at least one connector and at least one standalone downstream handler, wherein said connector directly connects to said standalone downstream handler; and wherein said standalone downstream handler is configured to communicate said at least electric power and optionally said data from said upstream handler.

11. A method of operating a multiport device configured to provide at least power routing and optionally data communications between different electronic products comprising a step of determining a master-slave configuration of said multiport device comprising the steps of: a) receiving input signals from at least two ports of said multiport device, wherein said ports are connected to said different electronic products; b) analyzing each of said input signals based on a plurality of predetermined criteria; c) selecting one of said at least two ports to connect to an upstream handler of said multiport device based on at least one of said criteria and labeling said selected port as master; d) connecting each remaining port to one of said at least one downstream handler of said multiport device and labeling each said remaining port as slave, wherein said upstream handler is configured to transfer at least electric power and optionally data to said at least one downstream handler; and said master controls the flow of at least said electric power and optionally said data between said master and each said slave,
   and wherein said plurality of predetermined criteria comprises at least one power priority that specifies a ranking priority for determining whether said electronic product or said multiport device acts as a power-master.

12. The method of claim 11, wherein input signals comprise voltage levels and said plurality of predetermined criteria comprises at least one threshold voltage level.

13. The method of claim 11, wherein input signals comprise electronic signal selected from Universal Serial Bus On The Go (USB OTG) signals and Lighting port signals.

14. The method of claim 11, wherein said plurality of predetermined criteria comprises at least one data priority list wherein said data priority list specifies a ranking priority for determining whether said electronic product or said multiport device acts as a data-master.

15. The method of claim 11, further comprising a step of providing a matrix switch for establishing connecting routes among said at least two ports, said upstream handler and said at least one downstream handler.

16. The method of claim 15, wherein said matrix switch further comprises at least three multiplexers; and further comprises a step of switching one of said multiplexers connected to said selected port to connect said selected port to said upstream handler.

17. The method of claim 11, further comprising the steps of re-connecting said selected master port to one of said at least one downstream handler of said device and labeling it as slave; and re-connecting said one of each remaining port labeled as slave to said upstream handler of said device and labeling it as master, while said different electronic products are still connected to said ports.

18. A hub system configured to provide at least power routing and optionally data communications between different electronic products, comprising: a) at least two ports configured to connect between said different electronic products; b) at least two gateways; each of said gateways has a first terminal and a second terminal; wherein said first terminal of each said gate way is connected to one of said ports; and c) a control system connected to said second terminal of each said gateway; wherein each said gateway individually detects a power master/slave status of said electronic product connected to said port; wherein said control system is configured to control each said gateway to perform self-configuration to match said power master/slave status of each said electronic product connected to said port; wherein said control system is configured to establish connecting routes between each said port for transferring at least electric power from a power master to a power slave, and optionally data between each said port.

19. The system of claim 18, wherein said control system comprising: a) a hub comprising an upstream handler and at least one downstream handler, wherein said upstream handler is configured to connect said at least one downstream handler inside said hub; b) a multiplexer hub connected to at least two said gateways and an multiplexer; and c) a control unit connected to said upstream handler of said hub and further connected to said multiplexer, wherein said control unit is configured to establish connecting routes between each said port for transferring at least electric power and optionally data between each said port.

20. The system of claim 19, wherein at least one said gateway is further directly connected to said multiplexer to direct transfer at least said electric power and optionally said data.

21. The system of claim 19, wherein at least one said downstream handler is further directly connected to at least one said gateway.

22. The system of claim 19, further comprising at least one detector connected to at least one of said ports through said gateway connected to that port, wherein said detector configured to detect a master/slave status of said electronic products connected to that port.

23. The system of claim 22, wherein said detector is integrated into said gateway.

24. The system of claim 18, wherein said at least two ports are Universal Serial Bus (USB) ports, Lighting ports, Ethernet ports, or controller area network ports.

25. A method of operating a multiport device configured to provide at least power routing and optionally data communications between different electronic products comprising the steps of: a) receiving input signals from at least two ports of said multiport device, wherein said ports are connected to said different electronic products; b) detecting a master/slave status of each said electronic product by analyzing said input signals of said port connected to said electronic product based on a plurality of predetermined criteria; c) configuring said multiport device to match said master/slave status of each said electronic product connected to said multiport device, wherein said at least power and optionally data can be exchanged among said electronic products and said multiport device, and wherein said plurality of predetermined criteria comprises at least one power priority list that specifies a ranking priority for determining whether said electronic product or said multiport device acts as a power-master.

26. The method of claim 25, wherein said input signals comprise voltage levels and said plurality of predetermined criteria comprises at least one threshold voltage level.

27. The method of claim 25, wherein said input signals comprise electronic signal selected from Universal Serial Bus On The Go (USB OTG) signals, Lighting port signals, Ethernet port signals, and controller area network (CAN) port signals.

28. The method of claim 25, wherein said plurality of predetermined criteria comprises at least one data priority list wherein said data priority list specifies a ranking priority for determining whether said electronic product or said multiport device acts as a data-master.

* * * * *